(12) United States Patent
Yi et al.

(10) Patent No.: US 11,563,609 B2
(45) Date of Patent: *Jan. 24, 2023

(54) METHOD AND USER EQUIPMENT FOR RECEIVING DOWNLINK SIGNAL, METHOD AND BASE STATION FOR TRANSMITTING DOWNLINK SIGNAL

(71) Applicant: LG Electronics Inc., Seoul (KR)

(72) Inventors: Yunjung Yi, Seoul (KR); Hyangsun You, Seoul (KR); Kijun Kim, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/985,897

(22) Filed: Aug. 5, 2020

(65) Prior Publication Data

US 2020/0367216 A1      Nov. 19, 2020

Related U.S. Application Data

(63) Continuation of application No. 16/065,442, filed as application No. PCT/KR2017/006395 on Jun. 19, 2017, now Pat. No. 10,805,913.

(Continued)

(51) Int. Cl.
*H04W 72/04* (2009.01)
*H04L 27/26* (2006.01)
*H04L 5/00* (2006.01)

(52) U.S. Cl.
CPC ............ *H04L 27/2602* (2013.01); *H04L 5/00* (2013.01); *H04L 5/0007* (2013.01);
(Continued)

(58) Field of Classification Search
CPC ....... H04L 27/26; H04L 27/2602; H04L 5/00; H04L 5/0007; H04L 5/0037;
(Continued)

(56) References Cited

U.S. PATENT DOCUMENTS

2006/0187876 A1   8/2006   Schmidl et al.
2013/0100888 A1   4/2013   Shimezawa et al.
(Continued)

FOREIGN PATENT DOCUMENTS

CN            1635803        7/2005
CN            102202346      9/2011
(Continued)

OTHER PUBLICATIONS

Chinese Office Action in Chinese Application No. 201780037211.4, dated Nov. 18, 2020, 24 pages (with English translation).
(Continued)

*Primary Examiner* — Mansour Oveissi
(74) *Attorney, Agent, or Firm* — Fish & Richardson P.C.

(57) ABSTRACT

A user equipment is provided with puncturing information indicating a resource to which downlink data is punctured among time-frequency resources to which the downlink data is allocated. The user equipment may decode the downlink data received in the time-frequency resource on the basis of the puncturing information. The downlink data may be mapped to the time-frequency resource by a combined method of a time-first resource mapping method and a frequency-first resource mapping method, or by a distributed resource mapping method.

12 Claims, 9 Drawing Sheets

Related U.S. Application Data

(60) Provisional application No. 62/407,467, filed on Oct. 12, 2016, provisional application No. 62/401,931, filed on Sep. 30, 2016, provisional application No. 62/373,944, filed on Aug. 11, 2016, provisional application No. 62/359,682, filed on Jul. 7, 2016, provisional application No. 62/351,311, filed on Jun. 17, 2016.

(52) U.S. Cl.
CPC .......... *H04L 5/0044* (2013.01); *H04L 5/0048* (2013.01); *H04L 27/26* (2013.01); *H04W 72/042* (2013.01); *H04W 72/044* (2013.01); *H04L 27/2603* (2021.01); *H04L 27/26025* (2021.01)

(58) Field of Classification Search
CPC ... H04L 5/0044; H04L 5/0048; H04L 5/0064; H04L 5/0096; H04W 72/042; H04W 72/044
See application file for complete search history.

(56) References Cited

U.S. PATENT DOCUMENTS

| | | | |
|---|---|---|---|
| 2015/0334702 A1 | 11/2015 | Ji et al. | |
| 2017/0290004 A1 | 10/2017 | Yang et al. | |
| 2017/0318564 A1 | 11/2017 | Lee et al. | |
| 2018/0123769 A1* | 5/2018 | Pelletier | H04L 5/0094 |
| 2019/0045487 A1 | 2/2019 | You et al. | |

FOREIGN PATENT DOCUMENTS

| | | |
|---|---|---|
| JP | 2012169693 | 9/2012 |
| JP | 2013534072 | 8/2013 |
| JP | 2015029280 | 2/2015 |
| JP | 2015525501 | 9/2015 |
| JP | 2015533043 | 11/2015 |
| JP | 2019511869 | 4/2019 |
| JP | 2019515579 | 6/2019 |
| KR | 20080060292 | 7/2008 |
| KR | 1020080060292 | 7/2008 |
| KR | 20110122193 | 11/2011 |
| KR | 1020110122193 | 11/2011 |
| KR | 101598754 | 3/2016 |
| WO | WO2008136614 | 11/2008 |
| WO | WO2013062359 | 5/2013 |
| WO | WO2011158762 | 8/2013 |
| WO | WO2015041475 | 3/2015 |
| WO | WO2016064039 | 4/2016 |
| WO | WO2016074096 | 5/2016 |
| WO | WO2017155607 | 9/2017 |
| WO | WO2017171398 | 10/2017 |

OTHER PUBLICATIONS

International Search Report in International Application No. PCT/KR2017/006395, dated Oct. 26, 2017, 19 pages.

Japanese Office Action in Japanese Application No. 2018-566290, dated Nov. 26, 2019, 9 pages (with English translation).

Nokia, Alcatel-Lucent Shanghai Bell, "Punctured Scheduling for Low Latency Transmissions," R1-165381, Nanjing, P.R, China, dated May 23-27, 2016, 4 pages, XP051096643.

NTT DoCoMo, Inc., "On dynamic multiplexing of eMBB and URLLC for downlink," R1-1702817, 3GPP TSG RAN WG1 Meeting #88, Athens, Greece, dated Feb. 13-17, 2017, 4 pages.

Partial Supplementary European Search Report in European Application No. 17813652.9, dated Jan. 13, 2020, 15 pages.

Translation of the International Search Report in International Application No. PCT/KR2017/006395, dated Oct. 26, 2017, 6 pages.

ZTE, ZTE Microelectronics, "Frame structure design for NR," R1-164274, 3GPP TSG RAN WG1 Meeting #85, Nanjing, China, dated May 23-27, 2016, 11 pages, XP051090018.

* cited by examiner

METHOD AND USER EQUIPMENT FOR RECEIVING DOWNLINK SIGNAL, METHOD AND BASE STATION FOR TRANSMITTING DOWNLINK SIGNAL

CROSS-REFERENCE TO RELATED APPLICATIONS

This application is a continuation of U.S. application Ser. No. 16/065,442, filed on Jun. 22, 2018, now allowed, which is a National Stage application under 35 U.S.C. § 371 of International Application No. PCT/KR2017/006395, filed on Jun. 19, 2017, which claims the benefit of U.S. Provisional Application No. 62/407,467, filed on Oct. 12, 2016, U.S. Provisional Application No. 62/401,931, filed on Sep. 30, 2016, U.S. Provisional Application No. 62/373,944, filed on Aug. 11, 2016, U.S. Provisional Application No. 62/359,682, filed on Jul. 7, 2016, and U.S. Provisional Application No. 62/351,311, filed on Jun. 17, 2016. The disclosures of the prior applications are incorporated by reference in their entirety.

TECHNICAL FIELD

The present invention relates to a wireless communication system, and more particularly, to a method and apparatus for transmitting/receiving a downlink signal.

BACKGROUND

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at anytime and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

SUMMARY

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting / receiving data occurring at a low frequency is required.

In addition, a signal transmission/reception method is required in the system supporting new radio access technologies (NR).

The technical objects that can be achieved through the present invention are not limited to what has been particularly described hereinabove and other technical objects not described herein will be more clearly understood by persons skilled in the art from the following detailed description.

According to an aspect of the present invention, provided herein is a method of receiving a downlink signal by a user equipment. The method includes receiving puncturing information indicating a resource on which downlink data is punctured among time-frequency resources to which the downlink data is allocated; and decoding the downlink data received within the time-frequency resources based on the puncturing information.

According to another aspect of the present invention, provided herein is a user equipment for receiving a downlink signal. The user equipment includes a radio frequency (RF) unit, and a processor configured to control the RF unit. The processor: controls the RF unit to receive puncturing information indicating a resource on which downlink data is punctured among time-frequency resources to which the downlink data is allocated; and decodes the downlink data received within the time-frequency resources based on the puncturing information.

According to another aspect of the present invention, provided herein is a method of transmitting a downlink signal by a base station. The method includes: transmitting downlink data to a user equipment by puncturing a part of time-frequency resources to which the downlink data is allocated; and transmitting puncturing information indicating a resource on which the downlink data is punctured to the user equipment.

According to another aspect of the present invention, provided herein is a base station for transmitting a downlink signal. The base station includes a radio frequency (RF) unit, and a processor configured to control the RF unit. The processor: controls the RF unit to transmit downlink data to a user equipment by puncturing a part of time-frequency resources to which the downlink data is allocated; and controls the RF unit to transmit puncturing information indicating a resource on which the downlink data is punctured to the user equipment.

According to another aspect of the present invention, provided herein is a method of receiving a downlink signal by a user equipment. The method includes receiving downlink data on a time-frequency resource allocated to the user equipment; and recovering the downlink data mapped to the time-frequency resource. The downlink data is mapped to the time-frequency resource by a combination resource mapping scheme or a distributed resource mapping scheme. The combination resource mapping scheme maps the downlink data by a time-first frequency-second mapping scheme in each of X time regions included in a time-frequency resource region, X being an integer greater than 1. The distributed resource mapping scheme maps the downlink data in a diagonal direction in the time-frequency resource region.

According to another aspect of the present invention, provided herein is a user equipment for receiving a downlink signal. The user equipment includes a radio frequency (RF) unit, and a processor configured to control the RF unit. The processor: controls the RF unit to receive downlink data on a time-frequency resource allocated to the user equipment; and recovers the downlink data mapped to the time-frequency resource. The downlink data is mapped to the time-frequency resource by a combination resource mapping scheme or a distributed resource mapping scheme. The combination resource mapping scheme maps the downlink data by a time-first frequency-second mapping scheme in each of X time regions included in a time-frequency resource region, X being an integer greater than 1. The distributed resource mapping scheme maps the downlink data in a diagonal direction in the time-frequency resource region.

According to another aspect of the present invention, provided herein is a method of transmitting a downlink signal by a base station. The method includes mapping downlink data to a time-frequency resource allocated to a user equipment; and transmitting the downlink data mapped to the time-frequency resource. The downlink data is mapped to the time-frequency resource by a combination resource mapping scheme or a distributed resource mapping scheme. The combination resource mapping scheme maps the downlink data by a time-first frequency-second mapping scheme in each of X time regions included in a time-frequency resource region, X being an integer greater than 1. The distributed resource mapping scheme maps the downlink data in a diagonal direction in the time-frequency resource region.

According to another aspect of the present invention, provided herein is a base station for transmitting a downlink signal. The base station includes a radio frequency (RF) unit, and a processor configured to control the RF unit. The processor: maps downlink data to a time-frequency resource allocated to a user equipment; and controls the RF unit to transmit the downlink data mapped to the time-frequency resource. The downlink data is mapped to the time-frequency resource by a combination resource mapping scheme or a distributed resource mapping scheme. The combination resource mapping scheme maps the downlink data by a time-first frequency-second mapping scheme in each of X time regions included in a time-frequency resource region, X being an integer greater than 1. The distributed resource mapping scheme maps the downlink data in a diagonal direction in the time-frequency resource region.

In each aspect of the present invention, the time-frequency resources may span one or more orthogonal frequency division multiplexing (OFDM) symbol groups each including one or more OFDM symbols in a time domain. The puncturing information may indicate a punctured OFDM symbol group among the one or more OFDM symbol groups.

In each aspect of the present invention, the puncturing information may be transmitted or received on a puncturing channel received on a punctured OFDM symbol group basis.

In each aspect of the present invention, the base station may not transmit the puncturing channel with respect to an OFDM symbol group on which the downlink data is punctured and may transmit the puncturing channel with respect to an OFDM symbol group on which the downlink data is not punctured. Upon detecting the puncturing channel for an OFDM symbol group, the user equipment may determine that the downlink data is present on the OFDM symbol group. Upon not detecting the puncturing channel for an OFDM symbol group, the user equipment may decode the downlink data under the assumption that the downlink data is punctured.

In each aspect of the present invention, the puncturing information may indicate a resource punctured by data using numerology different from numerology of the downlink data.

In each aspect of the present invention, the puncturing information may be received or transmitted in a next downlink transmission time interval (TTI) of a downlink TTI in which the downlink data is received or transmitted.

In each aspect of the present invention, scheduling information about uplink data which is to be transmitted in a TTI shorter than a TTI of a basic length may be transmitted to the user equipment. The user equipment may transmit the uplink data at maximum transmission power or specific transmission power.

In each aspect of the present invention, information indicating X may be transmitted to the user equipment.

In each aspect of the present invention, the downlink data may be segmented into one or more code blocks and X may be determined based on the number of code blocks.

In each aspect of the present invention, the distributed resource mapping scheme sequentially may map the downlink data to a resource element $(m_{i+1}, n_{i+1})=((m_i+a) \bmod M, (n_i+b) \bmod N)$ starting from a resource element $(m_1, n_1)$ in the time-frequency resource region, $m_1$ being a lowest subcarrier index in the time-frequency resource region and $n_1$ being a lowest orthogonal frequency division multiplexing (OFDM) symbol index in the time-frequency resource region. The resource element $(m_{i+1}, n_{i+1})$ may be an (i+1)-th resource element to which the downlink data is mapped in the time-frequency resource region, M being the number of subcarriers in the time-frequency resource region, N being the number of OFDM symbols in the time-frequency resource region, and a and b being positive integers.

In each aspect of the present invention, a may be 1 and b may be 1.

In each aspect of the present invention, the downlink data may be segmented into a plurality of code blocks and the plural code blocks may be interleaved and then mapped in the time-frequency resource region.

The above technical solutions are merely some parts of the embodiments of the present invention and various embodiments into which the technical features of the present invention are incorporated can be derived and understood by persons skilled in the art from the following detailed description of the present invention.

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the NR system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION

Figure 1A:
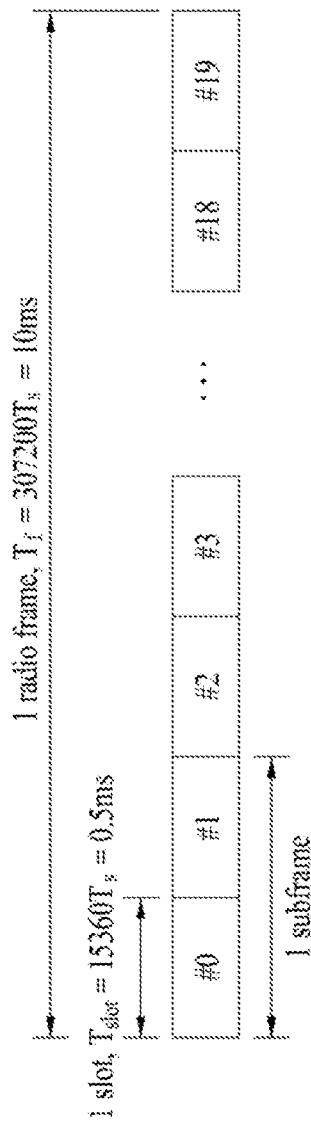
FIGS. 1A and 1B illustrate the structure of a radio frame used in the LTE/LTE-A based wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In embodiments of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Particularly, eNB is a term used to denote a BS supporting LTE radio access technology and gNB is a term used to denote a BS supporting new radio access technology network (NR). In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI- RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

Figure 1B:
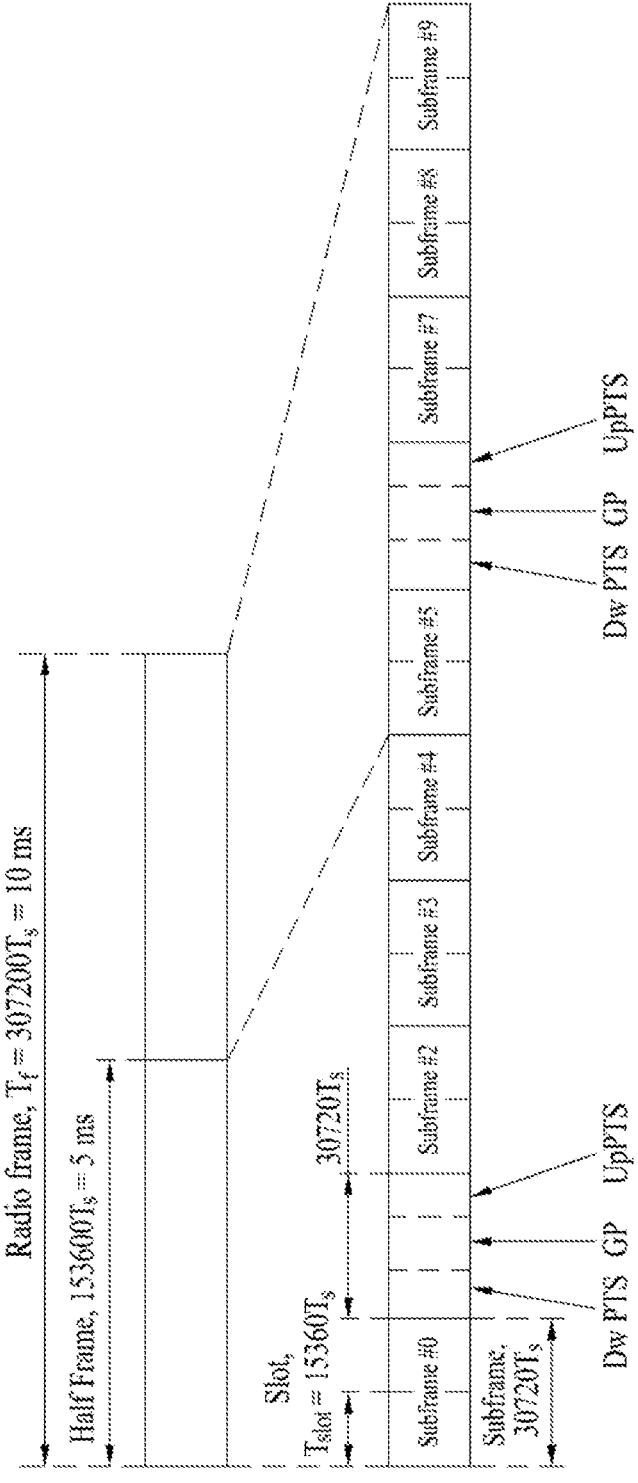

FIGS. 1A and 1B illustrate the structure of a radio frame used in a wireless communication system.

Specifically, FIG. 1A illustrates an exemplary structure of a radio frame which can be used in frequency division multiplexing (FDD) in 3GPP LTE/LTE-A and FIG. 1B illustrates an exemplary structure of a radio frame which can be used in time division multiplexing (TDD) in 3GPP LTE/LTE-A.

Referring to FIGS. 1A and 1B, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15 \text{ kHz})$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
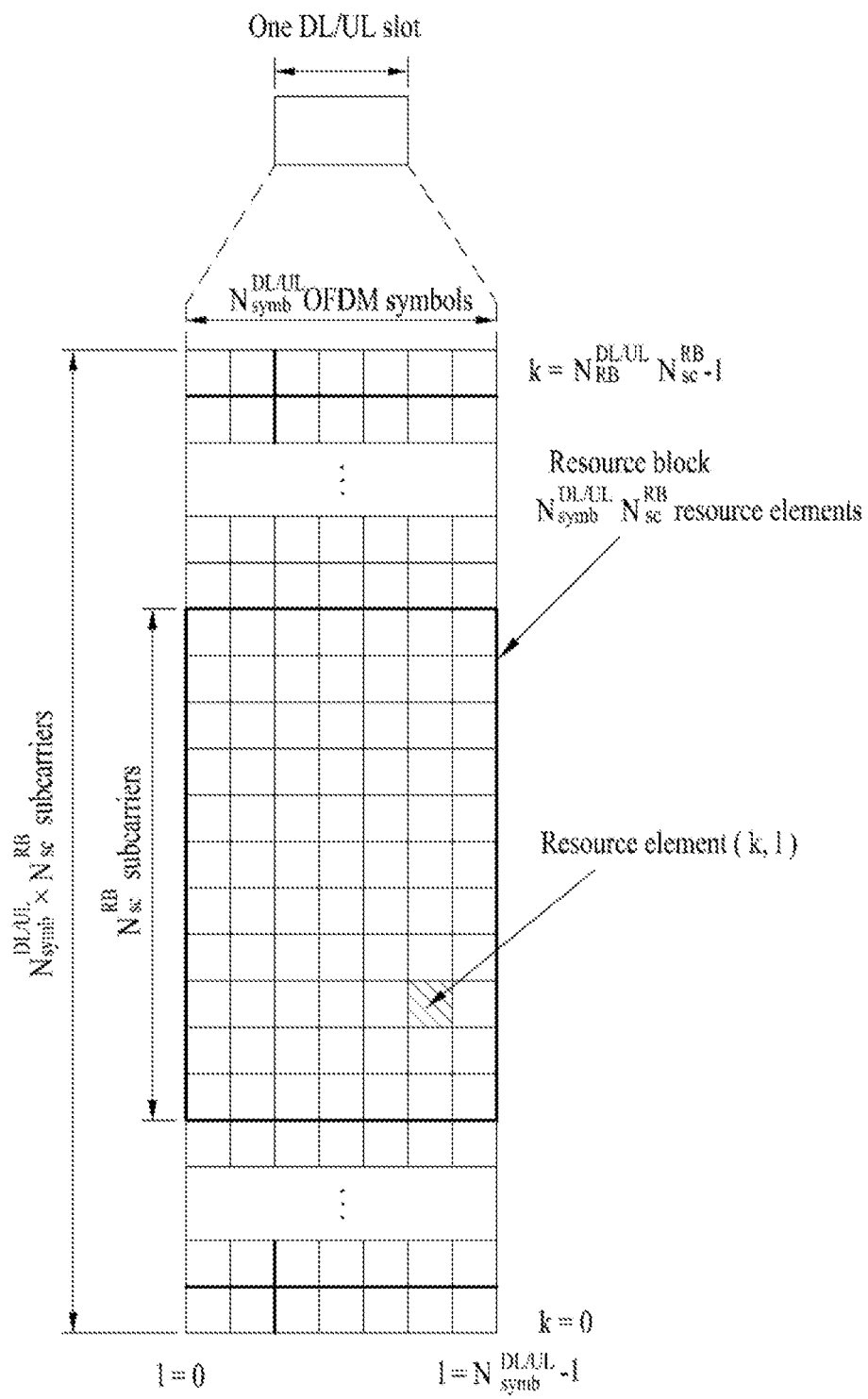
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{DL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}RB*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

Figure 3:
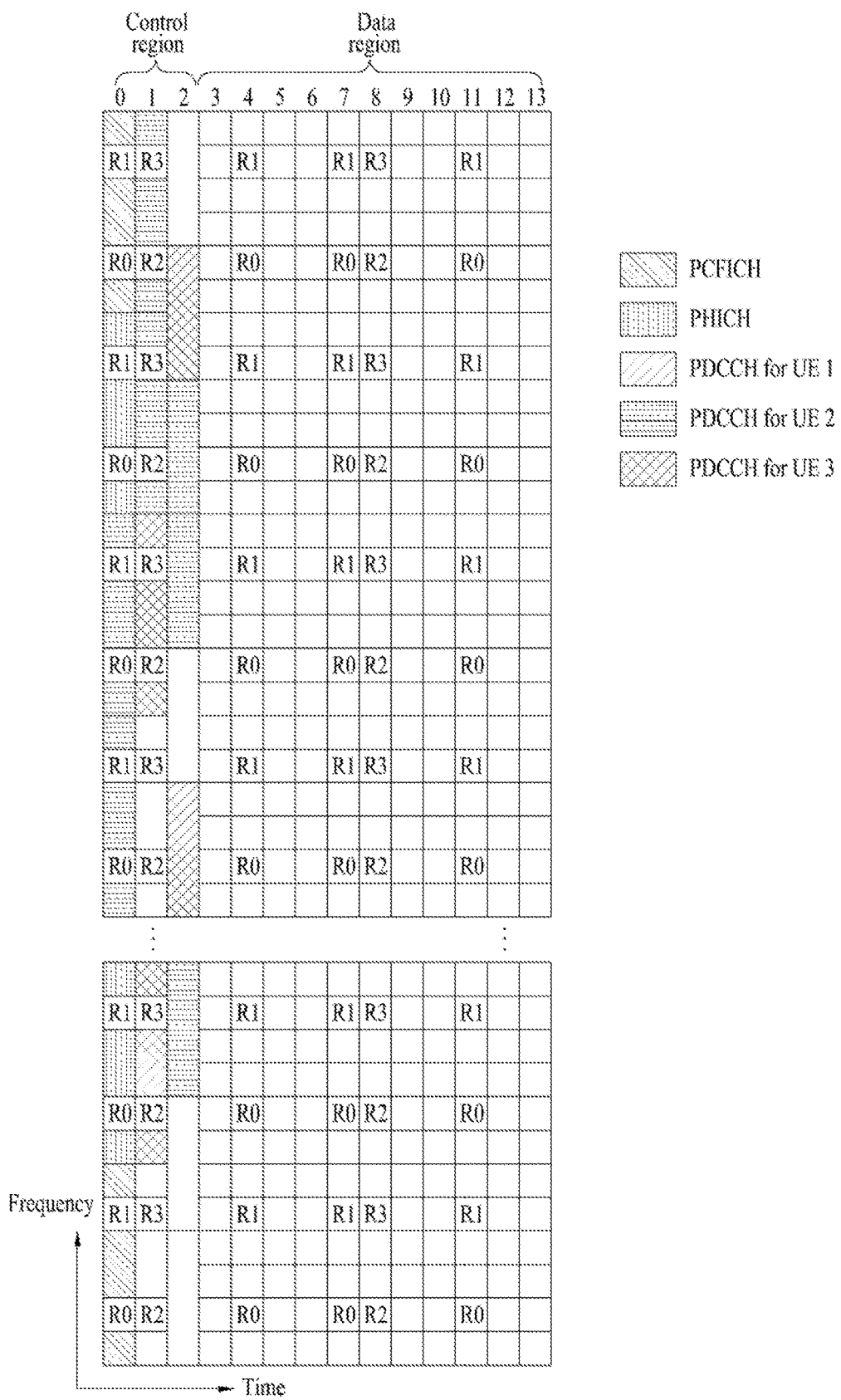
FIG. 3 illustrates the structure of a DL subframe used in the LTE/LTE-A based wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

The PDCCH is allocated to the first m OFDM symbol(s) in a subframe. Herein, m is an integer equal to or greater than 1 and is indicated by a PCFICH.

The PCFICH carries information about the number of OFDM symbols that DCI carried by the PDCCH spans. The PCFICH is transmitted on the first OFDM symbol of a subframe and carries information about the number of OFDM symbols used to transmit a control channel in a subframe. The PCFICH indicates, to the UE, the number of OFDM symbols used in a corresponding subframe with respect to every subframe. The PCFICH is located on the first OFDM symbol. The PCFICH is configured by 4 resource element groups (REGs) and each REG is distributed in a control region based on a cell ID. One REG includes 4 REs.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is NREG, the number of available CCEs in a DL subframe for PDCCH(s) in a system is numbered from 0 to $N_{CCE}-1$, where $N_{CCE}=floor(N_{REG}/9)$. A PDCCH including n consecutive CCEs may be transmitted only on CCEs fulfilling "i mod n=0" wherein i is a CCE number.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space $S^{(L)}_k$ at aggregation level $L \in \{1,2,4,8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

DCI formats that the UE should monitor depend on a transmission mode configured per serving cell. The eNB transmits an actual PDCCH (DCI) on a PDCCH candidate in a search space and the UE monitors the search space to detect the PDCCH (DCI). Here, monitoring implies attempting to decode each PDCCH in the corresponding SS according to DCI format(s) which the UE shall monitor. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Since the UE cannot infinitely perform blind decoding/detection (BS) in a subframe, the number of BD operations that can be performed by the UE in each subframe is defined. In UE-specific search spaces (USSs) including PDCCH candidates that are to carry UE-specific DCI, the number of PDCCH candidates that the UE should monitor is 16 in total, including 6 PDCCH candidates for aggregation level (AL) =1, 6 PDCCH candidates for AL=2, 2 PDCCH candidates for AL 4, and AL=8. In common search spaces (CSSs) including PDCCH candidates that are to carry common DCI, the number of PDCCH candidates that the UE should monitor is 6 in total, including 4 PDCCH candidates for AL=4 and 2 PDCCH candidates for AL=8.

Figure 4:
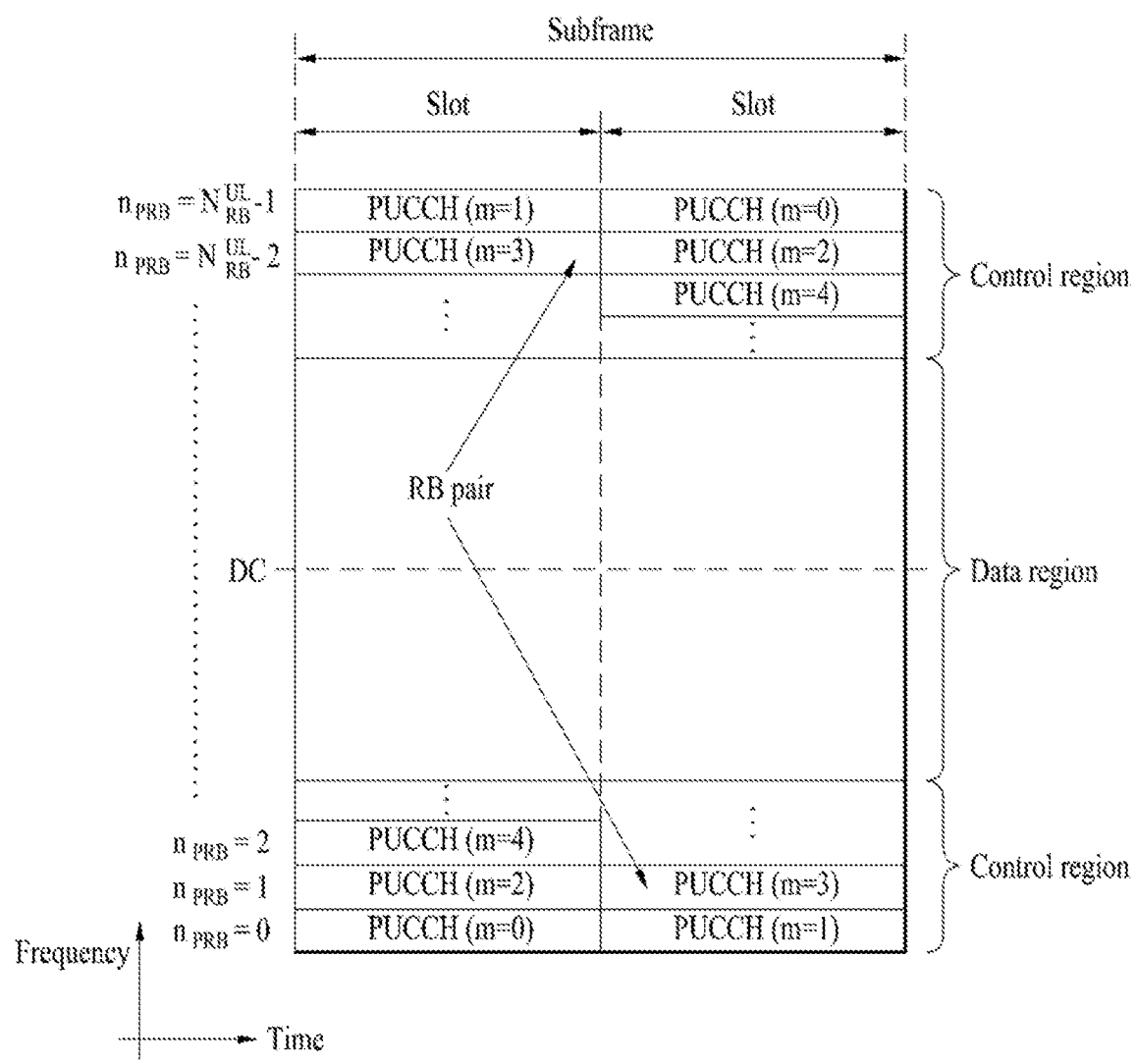
FIG. 4 illustrates the structure of a UL subframe used in the LTE/LTE-A based wireless communication system.

FIG. 4 illustrates the structure of a UL subframe used in the LTE/LTE-A based wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

The embodiments of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 5:
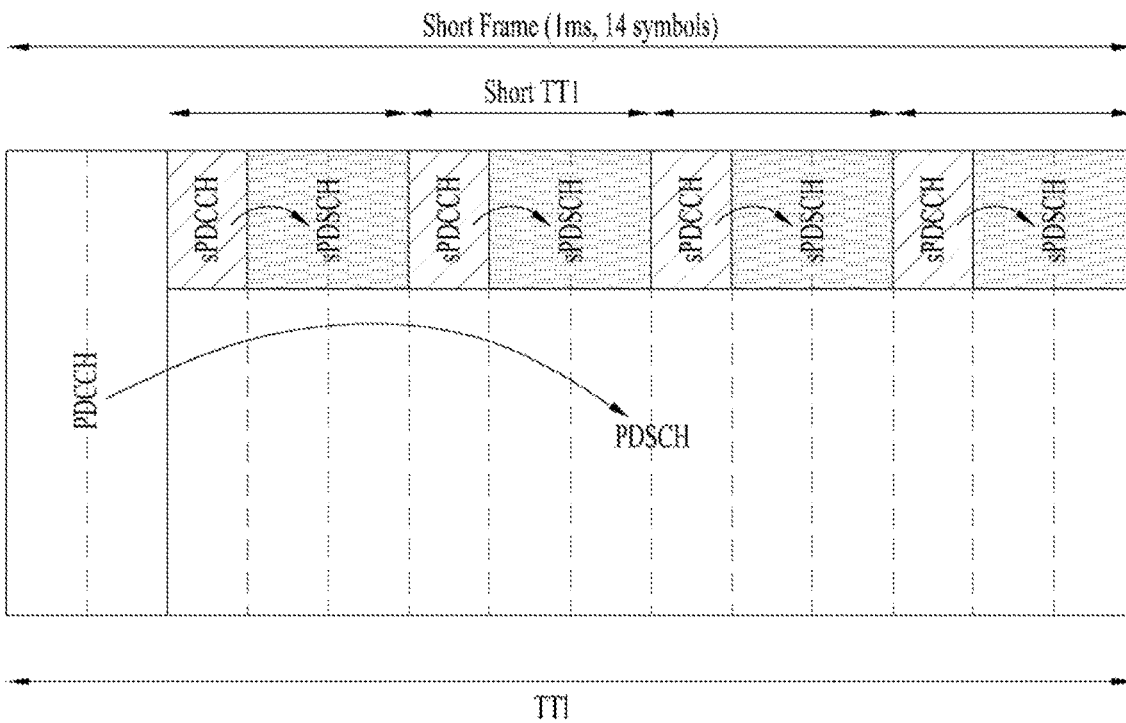
FIG. 5 illustrates an example of a short TTI and a transmission example of a control channel and a data channel in the short TTI.

FIG. 5 illustrates an example of a short TTI and a transmission example of a control channel and a data channel in the short TTI.

To reduce a user plane (U-plane) latency to 1 ms, a shortened TTI (sTTI) shorter than 1 ms may be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 5, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

<OFDM Numerology>

The new RAT system uses an OFDM transmission scheme or a similar transmission scheme. For example, the new RAT system may follow the OFDM parameters defined in the following table. Alternatively, numerology using parameters different from those shown in the following table may be defined. Alternatively, a new RAT system may conform to numerology of a legacy LTE/LTE-A system but may have a broader system bandwidth (e.g., 100 MHz) than the legacy LTE/LTE-A system. One cell may support a plurality of numerologies. For example, an NR system or an NR cell may support a plurality of numerologies in which subcarrier spacings are different. That is, UEs that operate using different numerologies may coexist within one cell.

TABLE 1

| Parameter | Value |
| --- | --- |
| Subcarrier-spacing (Δf) | 75 kHz |
| OFDM symbol length | 13.33 us |
| Cyclic Prefix (CP) length | 1.04 us/0.94 us |
| System BW | 100 MHz |
| No. of available subcarriers | 1200 |
| Subframe length | 0.2 ms |
| Number of OFDM symbol per Subframe | 14 symbols |

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ(wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

<Subframe Structure>

Figure 6:
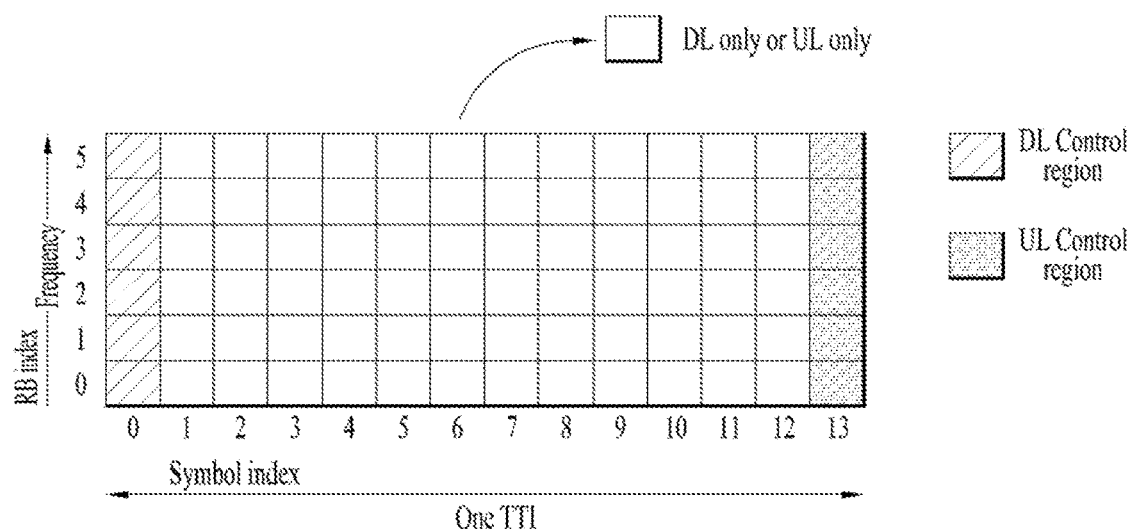
FIG. 6 illustrates the structure of an available subframe in a new radio access technology (NR) system.

FIG. 6 illustrates the structure of an available subframe in a new radio access technology (NR) system.

To minimize data transmission latency, new fifth-generation (5G) RAT considers a subframe structure in which a control channel and a data channel are time division multiplexed (TDMed).

In FIG. 6, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 6, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

In a legacy LTE/LTE-A system, a DL control channel is TDMed with a data channel (refer to FIG. 3) and a PDCCH, which is a control channel, is transmitted throughout an entire system band. However, in new RAT, it is expected that a bandwidth of one system reaches approximately a minimum of 100 MHz. Therefore, it is difficult to distribute the control channel throughout the entire band for transmission of the control channel. For data transmission/reception of the UE, if the entire band is monitored to receive the DL control channel, this may cause increase in battery consumption of the UE and deterioration of efficiency. Accordingly, the present invention proposes a scheme in which the DL control channel can be locally transmitted or distributively transmitted in a partial frequency band in a system band, i.e., a channel band.

Figure 7:
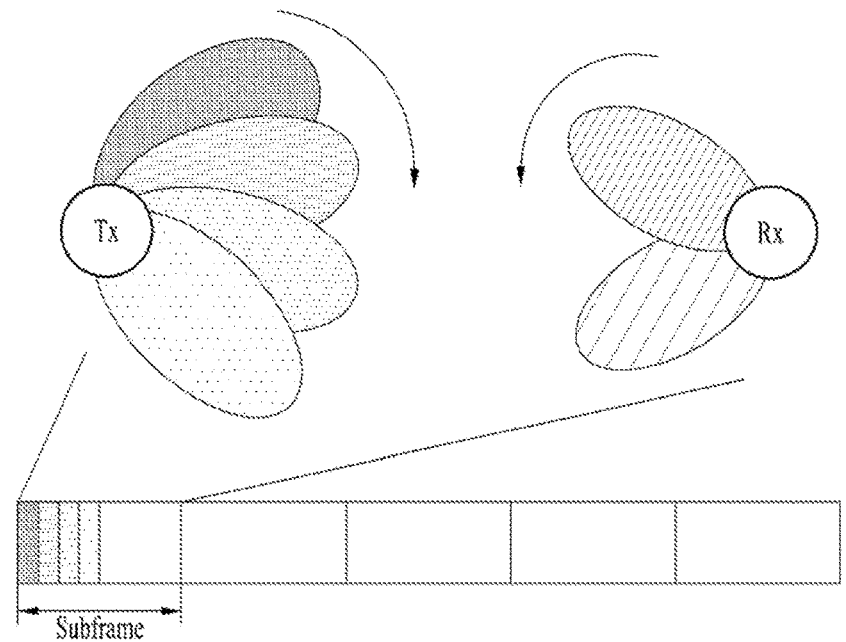
FIG. 7 illustrates an application example of analog beamforming.

FIG. 7 illustrates a transmission/reception method of a radio signal using an analog beam. Particularly, FIG. 7 illustrates a transmission/reception method of a radio signal by transmission/reception analog beam scanning.

Referring to FIG. 7, if an eNB transmits a synchronization signal in a cell or a carrier while switching beams, a UE performs synchronization with the cell/carrier using the synchronization signal detected in the cell/carrier and discovers a most suitable (beam) direction for the UE. The UE should be capable of acquiring a cell ID and a beam ID (corresponding to the beam direction) by performing this procedure. The UE may acquire signals, particularly, RS information, transmitted in the beam direction, for example, an RS sequence, seed information, and location, while acquiring the beam ID. The eNB may allocate a group ID to UEs that have acquired a specific beam ID, i.e., UEs capable of receiving a DL channel in a specific beam direction. Cell-common information may be temporally/spatially divided on a beam ID basis and then transmitted to the UE. The cell-common information may be transmitted to the UE by a beam ID common scheme.

Upon acquiring the beam ID in a cell, the UE may receive cell-specific information as beam ID or group ID specific information. The beam ID or group ID specific information may be information that UEs of a corresponding group commonly receive.

For convenience of description, a channel on which DL data is transmitted is referred to as a PDSCH and a channel on which UL data is transmitted is referred to as a PUSCH in the present invention. For convenience of description, although the present invention is described focusing upon a DL environment (transmission of the PDSCH), the present invention is applicable even to a UL environment (transmission of the PUSCH).

Figure 8:
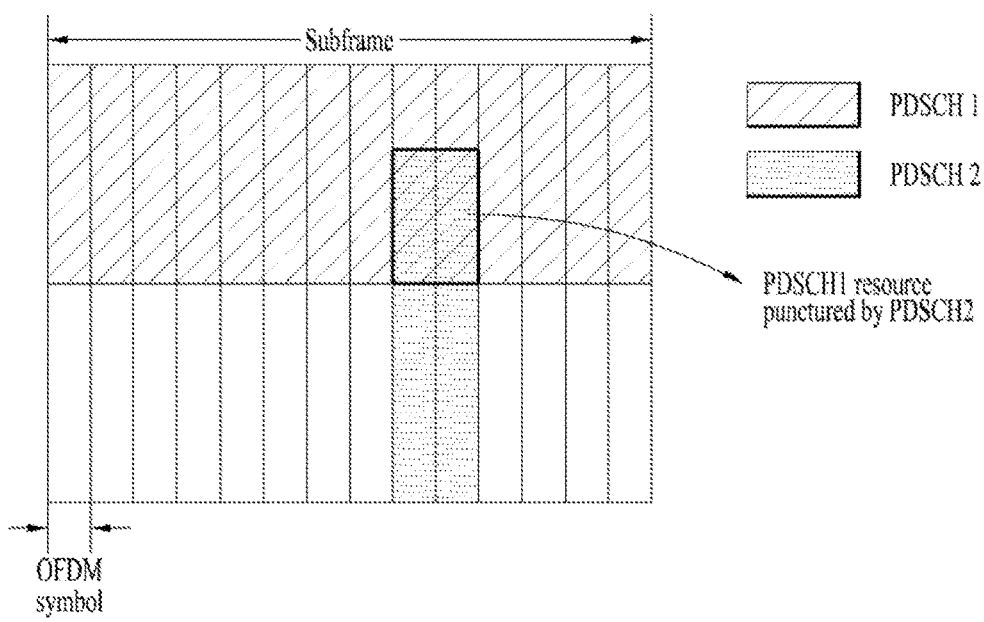
FIG. 8 illustrates collision caused by transmission of data of two different types on the same time-frequency resource.

FIG. 8 illustrates collision caused by transmission of data of two different types on the same time-frequency resource.

When data for which latency is important (e.g., URLLC data) can be transmitted through multiplexing with data for which latency is relatively less important (e.g., eMBB data) on the same frequency resource of the same cell, transmission of the data for which latency is important may collide with transmission of the data for which latency is less important on the same time-frequency resource. Generally, since the data for which latency is important is preferentially transmitted, the data for which latency is important, i.e., PDSCH2, may be transmitted by puncturing a resource of the data for which latency is less important, i.e., PDSCH1, as illustrated in FIG. 8. In this case, generally, PDSCH1 for which latency is less important is transmitted in a TTI longer than a TTI of PDSCH2 for which latency is important. Therefore, generally, a partial region of OFDM symbol(s) of PDSCH1 for which latency is less important is punctured for transmission of PDSCH2 for which latency is more important. In this case, data, a partial resource region of which has been punctured, is subjected to interference on the corresponding resource region and causes remarkable performance deterioration. If a UE that decodes PDSCH1 is not aware of the presence of PDSCH2 that has punctured a resource of PDSCH1, since the UE will recognize data located on the punctured resource as data of PDSCH1 and decode PDSCH1, error rate may increase. Accordingly, a method for improving reception performance of data punctured for transmission of other data is needed.

The present invention proposes a scheme in which a receiving device successfully receives data when other data is transmitted in a partial resource (OFDM symbol) region in which data is transmitted in a subframe in an NR environment.

Although the present invention is described mainly in consideration of the case in which a partial resource (e.g., OFDM symbol) region in which data is transmitted is punctured and other data is transmitted in the punctured resource region, the present invention may be applied even to the case in which the receiving device cannot correctly receive data on a partial resource on which data is transmitted due to inter-cell interference.

The present invention may be applied even to the case in which data transmitted in a legacy TTI or a longer TTI is punctured and transmitted due to data transmitted in an sTTI in an LTE/LTE-A system as well as an NR environment.

The present invention may also be applied to the case in which data cannot be correctly received due to intra-cell interference and/or inter-cell interference as well as the case in which data is punctured and transmitted due to transmission of other UL data and/or DL data in an environment using full duplex radio (FDR).

To raise reception performance of data, a partial resource region of which is punctured, the following schemes may be broadly considered in the receiving device.

Solution A) After a resource region not transmitted due to other data among resources of data is punctured, reception and decoding of the corresponding data is performed.

Solution B) Non-transmitted data (or data failing to be received) is recovered using an outer erasure code.

Hereinafter, although the present invention will be described under the assumption that a scheme such as Solution A or Solution B is used to raise reception performance of data, a partial resource region of which is punctured, the present invention may be applied even to the case in which other schemes are used.

<A. Method of Determining Location of OFDM Symbols on which Data is Punctured>

When a method such as Solution A as described above is used to raise reception performance of data, a partial resource region of which is punctured, the receiving device should be aware of a location at which data is to be punctured. Generally, since data for which latency is important (e.g., PDSCH2 of FIG. 8) is transmitted in the middle of transmission of data insensitive to a latency issue (e.g., PDSCH1 of FIG. 8), a UE receiving PDSCH1 is not aware of whether PDSCH2 is transmitted and of a transmission resource on which PDSCH2 is transmitted. Therefore, the UE should receive information about a punctured resource among PDSCH resources received thereby from an eNB. Even when a method such as Solution B is used, the UE may puncture received data and determine a data region in which the data is to be recovered through an outer erasure code, by receiving information about a punctured resource among PDSCH resources received thereby from the eNB. That is, the present invention proposes that whether data is punctured be indicated through a TTI in which the punctured data is present or the next TTI of the TTI in which the punctured data is present, in addition to informing the UE of a punctured part when the eNB receives NACK of data transmitted in subframe n and then performs retransmission of the data, the eNB schedules retransmission, or when the data is transmitted in subframe n. For example, the indication methods may be transmitted through retransmission DCI or an additional channel.

To this end, the eNB may indicate an OFDM symbol region in which data is punctured to the UE as follows.

Option A1. OFDM Symbol-Wise Indication

Figure 9:
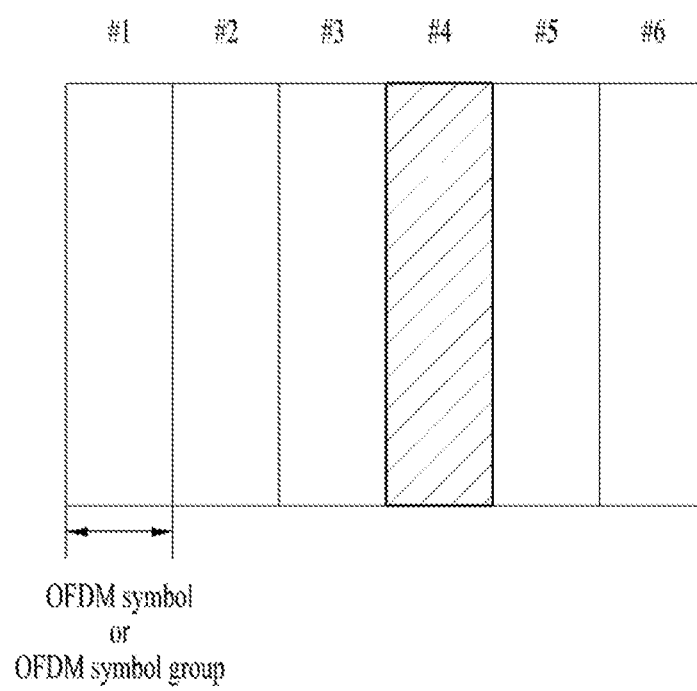
FIG. 9 illustrates an example of indicating a punctured OFDM symbol region according to the present invention.

FIG. 9 illustrates an example of indicating a punctured OFDM symbol region according to the present invention.

An eNB may indicate to a UE whether data is punctured on an OFDM symbol basis or on an OFDM symbol group basis. If it is indicated whether data is punctured on an OFDM symbol group basis to the UE, a region in which data is transmitted is classified into a plurality of OFDM symbol groups and the eNB and the UE may be commonly aware in advance that the data transmission region is classified into the OFDM symbol groups. These OFDM symbol groups may be distinguished by a boundary of a TTI shorter than a TTI of currently transmitted data. Namely, an OFDM symbol region belonging to the same TTI shorter than the TTI of the currently transmitted data may belong to the same OFDM symbol group. If there are multiple TTIs shorter than the TTI of the currently transmitted data, the OFDM symbol groups may be divided based on 1) a boundary of the shortest TTI, or 2) a boundary of a TTI shorter than the TTI in which the data is transmitted by one level (i.e., a boundary of the longest TTI among TTIs shorter than the TTI in which the data is transmitted). The following methods may be used to indicate to the UE whether data is punctured on an OFDM symbol basis or on an OFDM symbol group basis.

Method A1-a) For data transmission, a channel containing information indicating whether a corresponding OFDM symbol or OFDM symbol group (hereinafter, OFDM symbol (group)) is used may be newly introduced. In the present invention, this channel will be referred to as a puncturing indicator channel (PI_CH), for convenience of description. This channel is present on an OFDM symbol basis or on an OFDM symbol group basis, so that whether an OFDM symbol (group) on which the channel is transmitted or the next OFDM symbol (group) region of the OFDM symbol (group) on which the channel is transmitted is used for data transmitted may be indicated to the UE. This indication may be transmitted through the following scheme.

i. 1-bit data is transmitted through the corresponding channel,
  ii. a sequence constituting the corresponding channel differs according to a value of 1-bit information, or
  iii. whether the corresponding channel is transmitted differs according to the value of 1-bit information.

Method A1-b) Whether a specific OFDM symbol (group) is used for data transmission may be indicated to the UE by varying a reference signal (RS) sequence or a scrambling sequence. Herein, the specific OFDM symbol (group) may represent an OFDM symbol (group) on which the RS is transmitted and/or the next OFDM symbol (group) of the OFDM symbol (group) on which the RS is transmitted. For example, when there are scrambling sequence A and scrambling sequence B, if scrambling sequence A is applied to the RS, this may mean that the OFDM symbol (group) on which the RS is transmitted is used for data transmission and, if scrambling sequence B is applied to the RS, this may mean that the OFDM symbol (group) on which the RS is transmitted is not used for data transmission.

Method A1-c) Scrambling may be applied to data on an OFDM symbol (group) basis. That is, one scrambling sequence may be applied to a data part transmitted on one OFDM symbol (group). In other words, if N OFDM symbols (groups) are present in a TTI in which data is transmitted, the data is segmented into N blocks so that scrambling may be applied to each block and each block may be mapped within one OFDM symbol (group). In this case, whether a specific OFDM symbol (group) is used for data transmission may be indicated to the UE by varying a scrambling sequence applied to data transmitted in each OFDM symbol (group). This specific OFDM symbol (group) may mean an OFDM symbol (group) on which the corresponding data block is transmitted or the next OFDM symbol (group) of the OFDM symbol (group) on which the corresponding data block is transmitted.

Alternatively, if N OFDM symbols (groups) are present in a TTI in which data is transmitted, the data is segmented into N blocks so that a cyclic redundant check (CRC) may be attached to each block and each block may be mapped within one OFDM symbol (group). In this case, whether a specific OFDM symbol (group) is used for data transmission may be indicated to the UE by varying a scrambling sequence applied to a CRC of a data block transmitted on each OFDM symbol (group). This specific OFDM symbol (group) may mean an OFDM symbol (group) on which the corresponding data block is transmitted or the next OFDM symbol (group) of the OFDM symbol (group) on which the corresponding data block is transmitted.

If it is indicated whether the next OFDM symbol (group) region of a specific OFDM symbol (group) is used for data transmission, an indication of the first OFDM symbol (group) region in a subframe may be transmitted through the last OFDM symbol (group) of a previous subframe.

If Method A1-a) is used, the present invention operates as follows.

Option A1-1) Through the PI_CH, whether an OFDM symbol (group) on which the corresponding channel is transmitted is used for data transmission may be indicated. In this case, due to transmission of URLLC data using numerology different from that of currently transmitted data, a specific OFDM symbol (group) may not be used for transmission of the currently transmitted data. In this case, since signal transmission in the OFDM symbol (group) is performed using different numerologies, it is difficult to transmit the PI_CH. Accordingly, upon detecting the PI_CH, a receiving device (e.g., UE) may determine that a current OFDM symbol (group) is used for data transmission and, upon not detecting the PI_CH, the receiving device may determine that the current OFDM symbol (group) is not used for data transmission. For example, the UE may perform decoding of corresponding data under the assumption that the data is present, i.e., the data has not been punctured, on an OFDM symbol (group) on which the PI_CH is detected. Conversely, the UE may determine that corresponding data has been punctured on an OFDM symbol group on which the PI_CH is not detected and perform decoding by excluding a signal received on the OFDM symbol (group) on which the PI_CH is not detected from a decoding procedure or decode the signal after recovering the signal using an outer erasure code. If an OFDM symbol (group) punctured for data transmission of different numerologies is present among OFDM symbols (groups) on which data is transmitted to the UE, the eNB may inform the UE of the location of a punctured resource by transmitting the PI_CH for an OFDM symbol (group) which is not punctured to the UE and by not transmitting the PI_CH for an OFDM symbol (group) which is punctured to the UE.

Option A1-2) Through the PI_CH, whether the next OFDM symbol (group) of an OFDM symbol (group) on which the corresponding channel is transmitted is used for data transmission may be indicated. In this case, the receiving device may determine that a current OFDM symbol (group) is used for data transmission if the PI_CH is detected. If the PI_CH is not detected, the receiving device may determine that the current OFDM symbol (group) is not used for data transmission. However, in this case, the following problems may arise. For example, as illustrated in FIG. 9, when 6 OFDM symbols (OSs) and/or 6 OFDM symbol groups (hereinafter, OSs (groups)) are present, OS (group) #4 may not be used for data transmission. Hereinafter, in this case, an indication indicating that data is not transmitted in OS (group) #4 may be transmitted/received through OS (group) #3. Meanwhile, if OS (group) #5 is used for data transmission, this should be indicated through OS (group) #4. However, if signal transmission is performed using different numerologies due to URLLC data transmission on OS (group) #4, since the PI_CH is not transmitted and the UE cannot detect the PI_CH, the UE may recognize that OS #5 or OS group #5 is not used for data transmission. To solve the above problems, the UE may be implemented/configured to determine that the next OS (group) of an OS (group) indicated not to be used for data transmission is always used for data transmission.

Option A1-3) In Option A1-1 and Option A1-2, the PI_CH is transmitted on all or almost all OSs (groups) on which data is transmitted. In this case, there is disadvantage in that overhead increases due to transmission of the PI_CH. To solve this problem, a transmitting device may indicate, through the PI_CH, whether the next OFDM symbol group of an OFDM symbol (group) (hereinafter, OFDM symbol (group)) on which the corresponding channel is transmitted is used for data transmission. However, if the PI_CH is not detected, the receiving device may determine that a current OFDM symbol (group) is used for data transmission and, if the PI_CH is detected, the receiving device may determine that the current OFDM symbol (group) is not used for data transmission. In this case, as illustrated in FIG. 9, when 6 OFDM symbols (groups) are present and OS (group) #4 is not used for data transmission, the eNB may transmit the PI_CH on OS (group) #3 to cause the UE to determine that OS (group) #4 is not used for data transmission and may not transmit the PI_CH on OS (group) #4 to cause the UE to determine that OS (group) #5 is used for data transmission.

Option A2. Indicationpp of OFDM Symbol and/or OFDM Symbol Group used for Data Transmission of Previous Subframe in Next Subframe In subframe #n+k, an OFDM symbol (group) used (or not used) for data transmission in subframe #n may be indicated. In this case, the subframe may be replaced with an OFDM symbol region or a TTI in which data is transmitted. That is, even if the subframe is replaced with the OFDM symbol region or the TTI, Option A2 may be applied. An OFDM symbol (group) used (or not used) for data transmission in a specific subframe may be indicated in the next available subframe.

Such an indication may be transmitted through a PDCCH (or DCI) of a subframe in which the indication is given. This indication may be cell-specific, UE group-specific, or UE-specific. If the indication is cell-specific or UE group-specific, a PDCCH (or DCI) including information about the indication may be transmitted through a PDCCH common search space (CSS) region. The indication may be transmitted by a bitmap scheme with respect to an OFDM symbol (group) constituting a subframe, a TTI or a region in which data is transmitted. Alternatively, the indication may be transmitted by a method of indicating an index (or indexes) of an OFDM symbol (group) used/not used for data transmission.

Option A3. Indication of OFDM Symbol and/or OFDM Symbol Group used for Data Transmission by Last OFDM Symbol of Subframe An OFDM symbol (group) used for data transmission may be indicated on the last OFDM symbol or the last few OFDM symbols of a subframe. In this case, the subframe may be replaced with an OFDM symbol region or a TTI in which data is transmitted. That is, even if the subframe is replaced with the OFDM symbol region or the TTI, Option A3 may be applied.

Method A3-a) A new channel transmitted on the last OFDM symbol or the last few OFDM symbols of a subframe is introduced and an OFDM symbol (group) used (or not used) for data transmission on this channel may be indicated by the last symbol(s) of the corresponding subframe. The indication may be transmitted by a bitmap scheme with respect to an OFDM symbol (group) constituting a subframe, a TTI or a region in which data is transmitted. Alternatively, the indication may be transmitted by a method of indicating an index (or indexes) of an OFDM symbol (group) used/not used for data transmission.

Method A3-b) An additional code block rather than a code block constituting a transport block may be transmitted on the last OFDM symbol or the last few OFDM symbols of a subframe and an OFDM symbol (group) used (or not used) for data transmission in data constituting the additional code block may be indicated by the next available subframe. The indication may be transmitted by a bitmap scheme with respect to an OFDM symbol (group) constituting a subframe, a TTI or a region in which data is transmitted. Alternatively, the indication may be transmitted by a method of indicating an index (or indexes) of an OFDM symbol (group) used/not used for data transmission.

<B. Scheme for Successfully Transmitting Data having Latency Issue during UL Transmission>

In a UL environment, when data for which latency is important (e.g., URLLC data) and data for which latency is relatively less important (e.g., eMBB data) are multiplexed in the same frequency resource of the same cell and then are transmitted, transmission resources of data of the two types may collide. Herein, data for which latency is less important (hereinafter, PUSCH1) may have already been transmitted before data for which latency is more important (hereinafter, PUSCH2) is transmitted. In this case, a UE that has transmitted PUSCH1 may continue to transmit PUSCH1 regardless of whether PUSCH2 is scheduled and PUSCH1 may act as significant interference with respect to transmission of PUSCH2 for which latency is relatively important. Therefore, for successful transmission of PUSCH2, methods of reducing an effect on PUSCH1 by PUSCH2 are needed. Hereinafter, such methods are proposed.

Option B1. Stop of PUSCH Transmission

For successful transmission of PUSCH2, when transmission resources of PUSCH1 and PUSCH2 overlap, transmission of PUSCH1 may be stopped by the following methods.

Method B1-a) To this end, a new DL channel may be introduced to indicate whether PUSCH transmission is stopped on the DL channel. In the present invention, this channel will be referred to as a PUSCH_Drop channel, for convenience of description. One or multiple PUSCH_Drop channels may be present in a subframe, a TTI or an OFDM symbol region in which data is transmitted and may be located in different time regions (e.g., OFDM symbols). If stop of PUSCH transmission is indicated on at least one PUSCH_Drop channel while the UE receives the PUSCH_Drop channel(s), the UE may immediately stop PUSCH transmission. In this case, the UE need not receive a PUSCH_Drop channel which is transmitted after PUSCH transmission is stopped in a subframe, a TTI, or an OFDM symbol region in which a corresponding PUSCH has been transmitted. Such an indication may be transmitted by the following schemes.

i. 1-bit data is transmitted through the corresponding channel, or ii. a sequence constituting the corresponding channel differs according to a value of 1-bit information.

Method B 1-b) Whether PUSCH transmission is stopped may be indicated by varying a specific DL RS sequence or a scrambling sequence. For example, when there are scrambling sequence A and scrambling sequence B, if scrambling sequence A is applied to an RS, this means that PUSCH transmission is not dropped and, if scrambling sequence B is applied to the RS, this means that PUSCH transmission is dropped. One or plural RSs may be present in a subframe, a TTI, or an OFDM symbol region in which data is transmitted. Scrambling sequences may be independently applied to RSs located in different time regions (e.g., OFDM symbols). While receiving RSs in different time regions (e.g., OFDM symbols), if a scrambling sequence applied to an RS transmitted in at least one time region (e.g., OFDM symbol) indicates that PUSCH transmission is dropped, the UE may immediately stop transmitting a PUSCH.

In this case, an indication/configuration by an eNB, indicating whether PUSCH transmission is stopped, may be transmitted through a cell/carrier in which data is transmitted. For example, the indication/configuration by the eNB may be transmitted through DCI. Alternatively, upon considering a carrier aggregation (CA) and/or dual connectivity (DC) environment, the indication/configuration by the eNB may be transmitted through a PCell or a cell/carrier determined by the eNB. In this case, the cell/carrier may be limited to a specific cell/carrier in which DL transmission is performed during a subframe/time duration in which the UE transmits data. Alternatively, the indication/configuration by the eNB may be configured by any cell/carrier among specific cells/carriers in which DL transmission is performed in a subframe in which the UE receives data.

Option B2. Indication of OFDM Symbol and/or OFDM Symbol Group Location in which PUSCH is Punctured For successful transmission of PUSCH2, when transmission resources of PUSCH1 and PUSCH2 overlap, transmission of PUSCH1 may be punctured in an overlapping OFDM symbol resource. To this end, whether data is punctured on a corresponding OFDM symbol (group) and/or the next OFDM symbol (group) may be indicated to the UE on an OFDM symbol (group) basis.

Method B2-a) A new DL channel may be introduced to indicate whether PUSCH transmission is stopped in the DL channel. A plurality of DL channels may be present with respect to each OFDM symbol (group). Each channel may indicate whether PUSCH puncturing is performed on an OFDM symbol (group) on which the channel is transmitted and/or the next OFDM symbol (group) of the OFDM symbol (group) on which the channel is transmitted. Such an indication may be transmitted by the following schemes.

i. 1-bit data is transmitted through the corresponding channel, or ii. a sequence constituting the corresponding channel differs according to a value of 1-bit information.

Method B2-b) Whether a PUSCH is transmitted (whether the PUSCH is punctured) on a specific OFDM symbol (group) may be indicated to the UE by varying an RS sequence or a scrambling sequence. Herein, the specific OFDM symbol (group) may mean an OFDM symbol (group) on which the RS is transmitted and/or the next OFDM symbol (group) of the OFDM symbol (group) on which the RS is transmitted. For example, when there are scrambling sequence A and scrambling sequence B, if scrambling sequence A is applied to the RS, this means that the PUSCH is transmitted on the OFDM symbol (group) on which the RS is transmitted and, if scrambling sequence B is applied to the RS, this means that the PUSCH is punctured on the OFDM symbol (group) on which the RS is transmitted.

In this case, an indication/configuration by the eNB, indicating whether puncturing is performed, may be transmitted through a cell/carrier in which data is transmitted. Alternatively, upon considering a CA and/or DC environment, the indication/configuration by the eNB may be transmitted through a PCell or a cell/carrier determined by the eNB. In this case, the cell/carrier may be limited to a specific cell/carrier in which DL transmission is performed during a subframe/time duration in which the UE transmits data. Alternatively, the indication/configuration by the eNB may be configured by any cell/carrier among specific cells/carriers in which DL transmission is performed in a subframe in which the UE receives data.

Option B3. Transmission of PUSCH for which latency is important at high power

For successful transmission of PUSCH2, when another PUSCH has already been transmitted on a transmission resource of PUSCH2, a possibility of transmission success of PUSCH2 may be raised by raising transmission power of PUSCH2. Herein, the PUSCH may be a PUSCH of a UE that transmits PUSCH2 or a PUSCH transmitted by a UE different from the UE that transmits PUSCH2.

Method B3-a) When the eNB schedules a PUSCH transmitted in a short TTI, the eNB may set an absolute value of PUSCH power through DCI for scheduling the PUSCH so that the UE may transmit the PUSCH at high power regardless of previous PUSCH transmission power. Alternatively, a specific value of a field for setting the PUSCH power through the DCI for scheduling the PUSCH may mean a maximum power value or a specific power value for PUSCH transmission. Alternatively, PUSCH transmission power may be set to the maximum power value or the specific power value through an explicit field of the DCI for scheduling the PUSCH.

Method B3-b) URLLC UL data transmitted in an sTTI may always be transmitted at the maximum power value or the specific power value.

Method B3-c) When the UE detects that another signal is being transmitted through sensing before transmitting the PUSCH (especially, URLLC UL data transmitted in an sTTI), the URLLC UL data transmitted in the sTTI may always be transmitted at the maximum power value or the specific power value.

In Option B3, the specific power value may be defined in the standard document or may be a power value configured for the UE through system information or a radio resource control (RRC) signal.

<C. Data Mapping Method for Improving Data Recovery Performance>

When data for which latency is important (hereinafter, PDSCH2) is transmitted by puncturing a resource of data for which latency is less important (hereinafter, PDSCH1), the following methods may be used to reduce an effect of PDSCH2 on PDSCH1. The UE may demap a received signal from a resource region under the assumption that the following mapping schemes have been used. The UE may perform decoding based on the demapped signal.

Inter-code Block (CB) Interleaving

Data transmitted on a PDSCH may be segmented into a plurality of code blocks. In a legacy LTE/LTE-A system, code blocks are sequentially mapped to resources. For example, code blocks CB0 to CB49 are sequentially mapped to transmission resources according to frequency-first time-second. In this case, if a partial OFDM symbol region is punctured by another PDSCH, there is a danger of puncturing most resources of a specific code block. Accordingly, there is a very high possibility of incorrectly receiving the specific code block. To randomize interference caused by transmission of other data, a transmitting device may perform interleaving between inter-code blocks. That is, in a process of concatenating a code block, a plurality of code blocks is not successively concatenated. Instead, one or multiple bits are selected from a plurality of code blocks randomly or according to a specific function, thereby performing code block concatenation. Alternatively, after code block concatenation, the concatenated code blocks may be interleaved randomly or according to a specific function.

Data Mapping within Sub-PRB

To minimize a resource region punctured by transmission of other data, the transmitting device may transmit data in as wide a PRB region as possible instead of transmitting data only in a partial frequency region in one PRB, while transmitting data (or URLLC data) in an sTTI. For example, instead of transmitting sTTI data in 25 PRBs, the transmitting device may transmit data in 50 PRBs by transmitting data on a half of subcarriers (e.g., 6 carriers) per PRB. This may be generalized such that the transmitting device may transmit data in N*K PRBs using only 1/K subcarriers in one PRB, instead of transmitting data in N PRBs. Thereby, the amount of resources punctured by data (or URLLC data) transmitted in an sTTI may be reduced.

Time-First Resource Mapping

To prevent a high possibility of incorrectly receiving a specific code block because most resources of the code block are punctured, time-first resource mapping may be performed instead of legacy frequency-first resource mapping. That is, during data transmission, if an OFDM symbol index on which data is mapped is t=0, 1, . . . T and a subcarrier index on which the data is mapped is f=0, 1, . . . F, time-first resource mapping is performed in a direction of first increasing the OFDM symbol index by performing data mapping starting from the lowest subcarrier index and the lowest OFDM symbol index. If the OFDM symbol index becomes T, data mapping is performed after setting the OFDM symbol index t to 0 and increasing the subcarrier index f by 1 so that resource mapping is performed in a direction of again increasing the OFDM symbol index. In this way, data mapping may be performed until the OFDM symbol index t becomes T and the subcarrier index f becomes F. If multiple code blocks are present, a code block having a low index may be first mapped relative to a code block having a high index. Thus, if resource mapping is performed, one code block is transmitted throughout the time domain. Accordingly, when a specific OFDM symbol region is punctured or subjected to interference, a phenomenon in which only the specific code block is affected by such puncturing or interference can be prevented.

Combination of Time-First Mapping and Frequency-First Mapping

To prevent a high possibility of incorrectly receiving a code block because most resources of the code block are punctured, a combination of time-first resource mapping and frequency-first mapping may be used.

Frequency-first time-second mapping may be performed in each frequency region by dividing a frequency region in which data is mapped into a plurality of regions. For example, if a frequency region is divided into M regions and an index m denoting a frequency region is m=0, 1, . . . , M-1, resource mapping may be performed in the following order.

TABLE 2

Set i=0
For n=0, 1, ..., M-1
  For t=0, 1, ..., T-1
    For f = F/M*m, F/M*m+1, ..., F/M*(m+1)-1
      Map data symbol s(i) to RE corresponding to
frequency index f and OFDM symbol index t
      Increase i by 1
    end for
  end for
end for

*Alternatively, time-first frequency-second mapping may be performed in each OFDM symbol region by dividing an OFDM symbol region in which data is mapped into a plurality of regions. For example, if an OFDM symbol region is divided into N regions and an index n denoting an OFDM symbol region is n = 0, 1, . . . , N-1, resource mapping may be performed the following order.

TABLE 3

Set i=0
For n=0, 1, ..., N-1
  For f=0, 1, ..., F-1
    For t = T/N*n, T/N*n+1, ..., T/N*(n+1)-1
      Map data symbol s(i) to RE corresponding to frequency
index f and OFDM symbol index t
      Increase i by 1
    end for
  end for
end for When a transport block is divided into one code block or a small number of code blocks, the resource mapping scheme may not be needed. Accordingly, in this mapping scheme, the value of M or N may be determined based on a modulation and coding scheme (MCS) index, a modulation order, or a transport block size (TBS) (or a TBS index). Alternatively, the value of M or N may be determined according to the number of code blocks into which a transport block is divided. Alternatively, the value of M or N applied to data transmission may be configured through DCI or an RRC signal.

Distributed Resource Mapping

Figure 10:
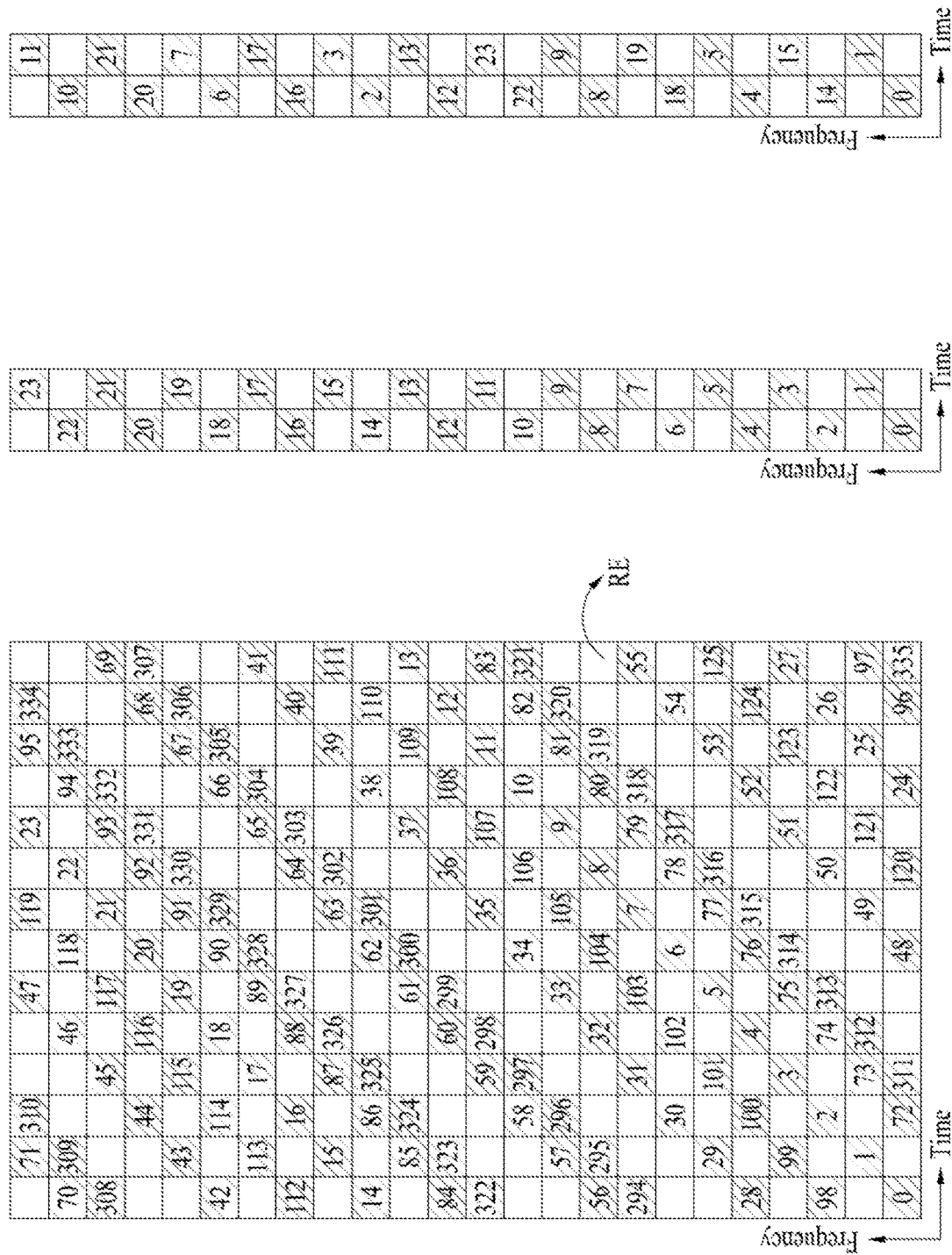
FIGS. 10A to 10C illustrate a resource mapping method according to the present invention.

FIGS. 10A to 10C illustrate a resource mapping method according to the present invention. A region shown in FIGS. 10A to 10C represent a resource region in which data is mapped and one square denotes one RE. In FIGS. 10A to 10C, a number written on each RE indicates a resource mapping order. In FIGS. 10A to 10C, an empty RE (RE on which a number is not written) indicates that the resource mapping order is omitted.

Meanwhile, to reduce an influence of PDSCH2 on PDSCH1 and to acquire both time diversity gain and frequency diversity gain, distributed resource mapping may be used. For example, resource mapping may be performed such that a resource mapping order may be distributed in both the time domain and the frequency domain in a resource on which data is transmitted by a specific function or rule.

For distributed resource mapping, resource mapping of data may be performed in a diagonal direction. In time-first resource mapping or frequency-first resource mapping used in a legacy LTE/LTE-A system, only one of a subcarrier index and an OFDM symbol index varies until the index reaches a boundary of a resource allocation region. In contrast, distributed resource mapping according to the present invention changes both the subcarrier index and the OFDM symbol index even before the index reaches a time boundary (i.e., a maximum OFDM symbol index) or a frequency boundary (i.e., a maximum subcarrier index) of a resource region allocated to corresponding data. For example, if a frequency-domain resource element (RE) index and a time-domain RE index are m and n, respectively, then resource mapping of data is performed starting from an RE in which m=0 and n=0 and each of the indexes m and n of the next RE on which resource mapping is to be performed may be increased by a (e.g., a=1) relative to the previously used RE indexes. For example, when a is 1, RE indexes which will be used after RE indexes of m=x and n=y may be m=x+1 and n=y+1. To prevent each index from deviating from a resource location at which data is transmitted, RE indexes which will be used after the RE indexes of m=x and n=y may be m=(x+1) mod M and n=(y+1) mod N. In this case, M may indicate the number of subcarriers on which a PDSCH is transmitted and N may indicate the number of OFDM symbols on which the PDSCH is transmitted. That is, if an RE($m_{i+1}$, $n_{i+1}$) on which data is first mapped in a mapping order is the first RE and an RE ($m_{i+1}$,-$n_{1+i}$) is the (i+1)-th RE (i=1,2,3, ... ) on which data is mapped, an index pair ($m_{i+1}$, $n_{i+1}$) of the (i+1)-th RE on which the data is mapped may be given by ($m_{i+1}$, $n_{i+1}$)= (($m_i$+1) mod M, ($n_i$1) mod N)). An example of such resource mapping is illustrated in FIGS. 10A and 10B. Particularly, in FIG. 10A, the number of OFDM symbols on which a PDSCH is transmitted is 14, the number of subcarriers on which the PDSCH is transmitted is 24, and a=1. In FIG. 10B, the number of OFDM symbols on which the PDSCH is transmitted is 2, the number of subcarriers on which the PDSCH is transmitted is 24, and a=1. In this case, if resource mapping has already been performed on an RE on which resource mapping is to be performed, a time index or a frequency index may be increased by b (e.g., b=1). If an RE resource on which data is to be mapped is used by other channels/signals (e.g., RSs), resource mapping may be punctured or rate-matched.

As another example of the distributed resource mapping method, time-first mapping or frequency-first mapping may be performed wherein a time index and/or a frequency index may be increased by an interval greater than 1. For example, if resource mapping is performed on an RE in which frequency index m=x and time index n=y, RE indexes on which next resource mapping is to be performed may be m=x+a and n=y+b wherein a and b are integers greater than 1. If an RE index reaches a boundary of a data transmission resource so that the RE index cannot be increased any longer, the RE index may be wrapped around and reset to 0. That is, if an RE ($m_1$, $n_1$) on which data is first mapped in a mapping order is the first RE and RE ($m_{i+1}$, $n_{i+1}$) is the (i+1)-th RE (i=1,2,3, ... ) on which the data is mapped, then an index pair (($m_{i+1}$, $n_{i+1}$) of the (i+1)-th RE on which the data is mapped may be given as ($m_{i+1}$, $n_{i+1}$)=(($m_i$+a) mod M, ($n_o$+b) mod N)). FIG. 10C illustrates the case in which the number of OFDM symbols on which a PDSCH is transmitted is 2, the number of subcarriers on which the PDSCH is transmitted is 24, a=14, and b=1. In this case, if resource mapping has already been performed on an RE on which resource mapping is to be performed, a time index or a frequency index may be increased by c (e.g., c=1). If an RE resource on which data is to be mapped is used by other channels/signals (e.g., RSs), resource mapping may be punctured or rate-matched.

The above-described transmission scheme(s) according to inter-code block interleaving, time-first resource mapping, combination mapping of time-first mapping and frequency-first mapping, and/or distributed resource mapping may be performed as follows.

The above transmission schemes may be applied when one transport block is divided into a plurality of code blocks. The plural code blocks may represent 1) two or more code blocks, 2) code blocks of a specific number or more defined in the standard document, or 3) code blocks of a specific number or more configured by a system information block (SIB), an RRC signal, etc.

Whether the above transmission schemes are applied to data transmission may be indicated through DCI.

Whether the above transmission schemes are applied to data transmission may be indicated through an SIB, an RRC signal, etc.

If an importance degree of latency of data is indicated through an SIB, RRC, or DCI and if an indication indicating that latency of data is not important is given, it may be assumed that the above transmission schemes are applied.

To prevent a situation in which a specific frequency region resource or time region resource is continuously subjected to interference, a transmission scheme may differ during every retransmission. For example, a resource mapping scheme applied during initial transmission and a resource mapping scheme applied during retransmission may differ. Alternatively, an applied resource mapping scheme may differ according to a redundancy version (RV) value or a new data indicator (NDI) toggle value.

Whether the above transmission schemes are applied may differ according to an MCS index, a modulation order, or a TBS (or a TBS index). For example, if an MCS index, a modulation order or a TBS (or a TBS index) less than a specific value is configured, a legacy resource mapping method may be used and, if an MCS index, a modulation order, or a TB size (or a TBS index) greater than the specific value is configured, the proposed resource mapping methods may be applied.

<D. Data Reception Method through Blind Decoding>

For the eNB to transmit data to a UE for which latency is important (e.g., URLLC UE), the eNB may puncture data transmitted to a UE for which latency is relatively less important and transmit the data of the UE for which latency is important at a corresponding resource location . In this case, the UE for which latency is relatively less important may use the following method to successfully receive data although a part of the data transmitted to the UE is punctured. In the present invention, a UE for which latency is important is referred to as a URLLC UE and a UE for which latency is relatively less important is referred to as an eMBB UE, for convenience of description.

First, the eNB may indicate one or multiple candidate resources on which data can be punctured to the eMBB UE. This information may be configured through RRC or DCI. When data is transmitted to the eMBB UE through RRC or DCI, the eMBB UE may determine that data is transmitted on a resource configured for the eMBB UE without any puncturing or that data is transmitted through puncturing, using the puncturing candidate resources indicated by the eNB or one (or plural) candidate resources among the puncturing candidate resources. When data is transmitted to the eMBB UE, the eMBB UE is not aware of whether puncturing has actually been performed and of a puncturing resource location. Therefore, the eMBB UE may attempt to receive data through blind decoding with respect to the case in which puncturing is not used and the case in which data has been punctured using the puncturing candidate resources indicated by the eNB or one (or plural) candidate resources among the puncturing candidate resources.

For example, if puncturing resource candidate locations 1 and 2 are present in an eMBB transmission resource, the eNB may configure information about the resource locations for the eMBB UE. For example, the puncturing resource candidate location 1 may be OFDM symbol #m and the puncturing resource candidate location 2 may be OFDM symbol #n. In this case, during data reception, the eMBB UE may perform blind detection with respect to the case in which data is transmitted without puncturing, the case in which data is transmitted with puncturing at the puncturing resource candidate location 1, the case in which data is transmitted with puncturing at the puncturing resource candidate location 2, and/or the case in which data is transmitted with puncturing at both the puncturing resource candidate locations 1 and 2.

Figure 11:
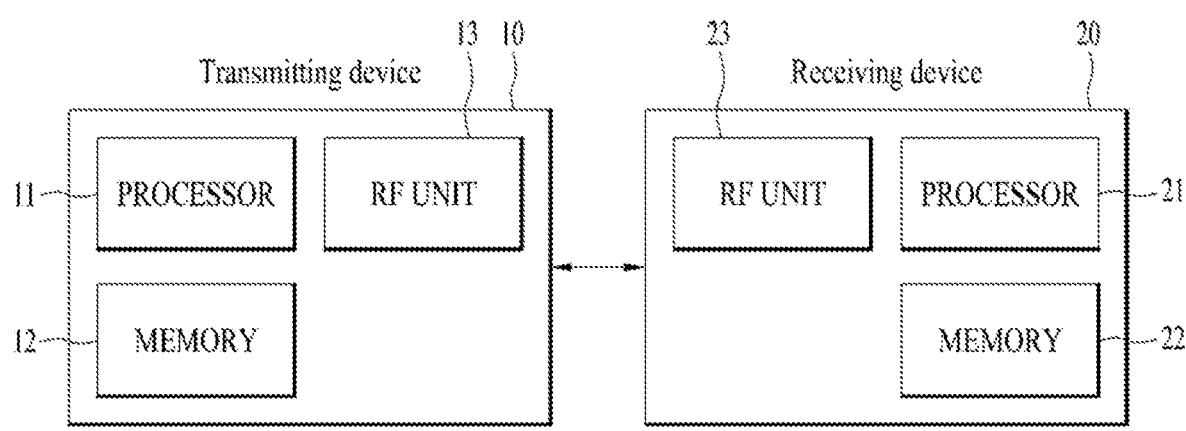
FIG. 11 is a block diagram illustrating elements of a transmitting device 10 and a receiving device 20 for implementing the present invention.

FIG. 11 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may control the eNB RF unit to transmit DL data according to the proposal of the present invention described in Section A. The eNB processor may control the eNB RF unit to transmit puncturing information indicating a punctured part to the UE. The UE processor may control the UE RF unit to receive the DL data according to the proposal of the present invention described in Section A. The UE processor may recover or decode the DL data, under the assumption that a signal is not present in a part in which the DL data is punctured, based on puncturing information according to the proposal of the present invention described in Section A.

The eNB processor may control the eNB RF unit to receive UL data according to the proposal of the present invention described in Option A3 of Section A. The UE processor may control the UE RF unit to transmit the UL data according to the proposal of the present invention described in Option A3 of Section A.

The UE processor may control the UE RF unit to transmit a PUSCH or stop transmitting the PUSCH according to the proposal of the present invention described in Section B. The eNB processor may control the eNB RF unit to receive the PUSCH or stop receiving the PUSCH according to the proposal of the present invention described in Section B.

The eNB processor may map DL data to a time-frequency resource region to which the DL data is allocated according to the proposal of the present invention described in Section C. The UE processor may recover or decode the DL data under the assumption that the DL data is mapped in the time-frequency resource region to which the DL data is allocated according to the proposal of the present invention described in Section C. That is, the UE processor may demap a signal received in the time-frequency resource region according to the proposal of the present invention described in Section C and decode the demapped signal according to the proposal of the present invention described in Section C.

The UE processor may blind-detect a punctured resource according to the proposal of the present invention described in Section D of the present invention.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The embodiments of the present invention are applicable to an eNB, a UE, or other devices in a wireless communication system.

What is claimed is:

1. A method of receiving downlink data by a wireless device, the method comprising:
   receiving downlink scheduling information for the downlink data;
   receiving the downlink data in a first time interval based on receiving the downlink scheduling information; and
   receiving downlink control information in a second time interval which is subsequent to the first time interval in a time domain,
   wherein the first time interval includes a plurality of orthogonal frequency division multiplexing, OFDM, symbols in the time domain,
   wherein the downlink control information includes information regarding one or more OFDM symbols, in which downlink data transmission to the wireless device is not present, among the plurality of OFDM symbols belonging to the first time interval preceding the second time interval in the time domain, and
   wherein the downlink control information is received through a physical downlink control channel on only a common search space in the second time interval.

2. The method according to claim 1,
   wherein the plurality of OFDM symbols in the first time interval are grouped into a plurality of OFDM symbol groups in the time domain,
   wherein the information regarding the one or more OFDM symbols in which downlink data transmission to the wireless device is not present includes a bitmap having a plurality of bits,
   wherein the plurality of bits are corresponding to the plurality of OFDM symbols groups, respectively, and
   wherein each of the plurality of bits indicates whether or not downlink data transmission to the wireless device is present in a corresponding OFDM symbol group among the plurality of OFDM symbol groups.

3. The method according to claim 2,
   wherein each OFDM symbol group indicated by the bitmap that downlink data transmission to the wireless device is not present in a corresponding OFDM symbol group among the plurality of OFDM symbol groups comprises a time-frequency resource punctured by data different from the downlink data.

4. A wireless device for receiving downlink data, the wireless device comprising:
   a radio frequency, RF, transceiver;
   a processor; and
   a memory storing at least one program that causes the processor to perform operations comprising:
   receiving, via the RF transceiver, downlink scheduling information for the downlink data;
   receiving, via the RF transceiver, the downlink data in a first time interval based on receiving the downlink scheduling information; and
   receiving, via the RF transceiver, downlink control information in a second time interval which is subsequent to the first time interval in a time domain,
   wherein the first time interval includes a plurality of orthogonal frequency division multiplexing, OFDM, symbols in the time domain,
   wherein the downlink control information includes information regarding one or more OFDM symbols, in which downlink data transmission to the wireless device is not present, among the plurality of OFDM symbols belonging to the first time interval preceding the second time interval in the time domain, and wherein the downlink control information is received through a physical downlink control channel on only a common search space in the second time interval.

5. The wireless device according to claim 4, wherein the plurality of OFDM symbols in the first time interval are grouped into a plurality of OFDM symbol groups in the time domain, wherein the information regarding the one or more OFDM symbols in which downlink data transmission to the wireless device is not present includes a bitmap having a plurality of bits, wherein the plurality of bits corresponds to the plurality of OFDM symbols groups, respectively, and wherein each of the plurality of bits indicates whether or not downlink data transmission to the wireless device is present in a corresponding OFDM symbol group among the plurality of OFDM symbol groups.

6. The wireless device according to claim 5, wherein each OFDM symbol group indicated by the bitmap that downlink data transmission to the wireless device is not present in a corresponding OFDM symbol group among the plurality of OFDM symbol groups comprises a time-frequency resource punctured by data different from the downlink data.

7. A method of transmitting downlink data by a base station, the method comprising:

transmitting downlink scheduling information for the downlink data;

transmitting first downlink data in a first time interval to a wireless device based on transmitting the downlink scheduling information;

transmitting second downlink data by puncturing a part of a time-frequency resource allocated to the first downlink data in the first time interval; and transmitting, to the wireless device in a second time interval which is subsequent to the first time interval in a time domain, downlink control information based on the punctured part of the time-frequency resource, wherein the first time interval includes a plurality of orthogonal frequency division multiplexing, OFDM, symbols in the time domain, wherein the downlink control information includes information regarding one or more OFDM symbols, in which downlink data transmission to the wireless device is not present, among the plurality of OFDM symbols belonging to the first time interval preceding the second time interval in the time domain, and wherein the downlink control information is transmitted through a physical downlink control channel on only a common search space in the second time interval.

8. The method according to claim 7, wherein the plurality of OFDM symbols in the first time interval are grouped into a plurality of OFDM symbol groups in the time domain, wherein the information regarding the one or more OFDM symbols in which downlink data transmission to the wireless device is not present includes a bitmap having a plurality of bits, wherein the plurality of bits corresponds to the plurality of OFDM symbols groups, respectively, and wherein each of the plurality of bits indicates whether or not downlink data transmission to the wireless device is present in a corresponding OFDM symbol group among the plurality of OFDM symbol groups.

9. The method according to claim 8, wherein each OFDM symbol group indicated by the bitmap that downlink data transmission to the wireless device is not present in a corresponding OFDM symbol group among the plurality of OFDM symbol groups comprises the punctured part of the time-frequency resource.

10. A base station for transmitting downlink data, the base station comprising:

a radio frequency, RF, transceiver;

a processor; and a memory storing at least one program that causes the processor to perform operations comprising:

transmitting, via the RF transceiver, downlink scheduling information for the downlink data:

transmitting, via the RF transceiver, first downlink data in a first time interval to a wireless device based on transmitting the downlink scheduling information;

transmitting, via the RF transceiver, second downlink data by puncturing a part of a time-frequency resource allocated to the first downlink data; and transmitting, via the RF transceiver in a second time interval which is subsequent to the first time interval in a time domain, downlink control information based on the punctured part of the time-frequency resource, wherein the first time interval includes a plurality of orthogonal frequency division multiplexing, OFDM, symbols in the time domain, wherein the downlink control information includes information regarding one or more OFDM symbols, in which downlink data transmission to the wireless device is not present, among the plurality of OFDM symbols belonging to the first time interval preceding the second time interval in the time domain, and wherein the downlink control information is transmitted through a physical downlink control channel on only a common search space in the second time interval.

11. The base station according to claim 10, wherein the plurality of OFDM symbols in the first time interval are grouped into a plurality of OFDM symbol groups in the time domain, wherein the information regarding the one or more OFDM symbols in which downlink data transmission to the wireless device is not present includes a bitmap having a plurality of bits, wherein the plurality of bits corresponds to the plurality of OFDM symbols groups, respectively, and wherein each of the plurality of bits indicates whether or not downlink data transmission to the wireless device is present in a corresponding OFDM symbol group among the plurality of OFDM symbol groups.

12. The base station according to claim 11, wherein each OFDM symbol group indicated by the bitmap that downlink data transmission to the wireless device is not present in a corresponding OFDM symbol group among the plurality of OFDM symbol groups comprises the punctured part of the time-frequency resource.

* * * * *